May 13, 1969 G. WILHELM 3,443,989
PROCESS FOR PROVIDING SUPERCONDUCTIVE LAYERS OF NIOBIUM-TIN
Filed April 28, 1965
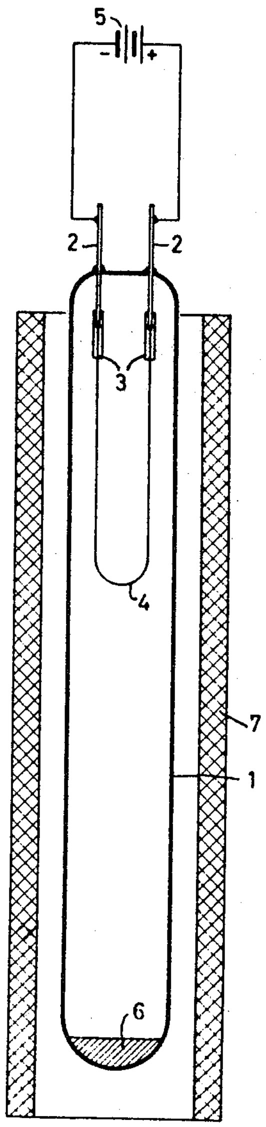

United States Patent Office 3,443,989
Patented May 13, 1969

3,443,989

PROCESS FOR PROVIDING SUPERCONDUCTIVE LAYERS OF NIOBIUM-TIN

Gunther Wilhelm, Burlafingen, near Neu-Ulm, Germany, assignor to Siemens Aktiengesellschaft, Erlangen, Germany, a corporation of Germany Filed Apr. 28, 1965, Ser. No. 451,572
Claims priority, application Germany, Apr. 30, 1964, S 90,862
Int. Cl. C23c *11/02;* C22c *13/00;* B32b *15/02*
U.S. Cl. 117—227 7 Claims

ABSTRACT OF THE DISCLOSURE

Described is a process for providing a coating of niobium-tin on a support. The process comprises reacting at a given temperature in one location of evacuated apparatus, a niobium-tin with a material which undergoes reaction with the niobium-tin to form reaction products which are gaseous at said given temperature and which undergoes a reverse dissociation reaction at a temperature higher than said given temperature, while concurrently heating at another location of said apparatus, said support to a temperature at least equal to said higher dissociation temperature but less than the melting point temperature of the material constituting said support, the gaseous reaction products being transported by gas diffusion from said colder one location to said hotter other location, said gaseous reaction products thermally dissociating at said other location and said niobium-tin compound dissociation product depositing upon said support.

This invention relates to superconductive niobium-tin compounds. More particularly, it relates to a process for providing a layer of a superconductive niobium-tin compound on underlying substrates.

The superconductive niobium-tin compound having the formula $Nb_3Sn$, because of its high transition temperature of 18° K. and its high critical magnetic field is of great technical importance and value in superconductive applications. The forming of superconductive niobium-tin layers on underlying support members enables the providing of many diversely shaped superconductive structures such as superconducting wires and ribbons and other different configuration superconductive elements.

Heretofore, many processes have been evolved for making layers of superconductive niobium-tin. In one of such processes, tin is applied to an underlying support or carrier comprising niobium such as a niobium wire, a suitable method of application being by evaporation of the tin onto the niobium wire or by electroplating the tin on the niobium wire. Thereafter, the tinned niobium wire or other structure may be heat treated to cause the tin to diffuse into the niobium whereby a niobium-tin layer is formed on the surface of the niobium support. In another of these processes, a niobium structure is dipped into molten tin and a niobium-tin layer forms on the surface, also through diffusion of the tin into the niobium. In yet another of these processes, the niobium-tin compound is deposited on suitable support materials by the reduction of the gaseous chlorides of niobium and tin with hydrogen to liberate niobium and tin which deposit on the support materials as niobium-tin.

To carry out the above described known processes, quite expensive apparatus is required in all of them and, in some, the use of high temperatures is necessary. Furthermore, the niobium-tin layers which are produced thereby do not consistently exhibit homogeneous and uniform superconducting characteristics. Particularly, the layers have differing transition temperatures which, in many cases, are below 18° K.

Accordingly, it is an important object of this invention to provide a simple and relatively inexpensive process for providing superconductive niobium-tin layers.

In is another object to provide a process in accordance with the preceding object which provides niobium-tin layers having uniform and homogeneous superconducting characteristics and wherein the transition temperatures of these layers is substantially constant.

To obtain the foregoing objects in accordance with the invention, there is provided a process for depositing a superconducting niobium-tin layer or coating on an underlying carrier or support employing chemical transport reactions.

In chemical transport reactions, reactions occur between substances at one location of a reaction system to produce gaseous reaction products, while at other locations in the system, reverse dissociation reactions take place to produce the original reactants. A condition precedent for the effecting of a chemical transport reaction in addition to the ability of reversing of the chemical reaction, is the presence of a gas concentration gradient which may be provided by having temperature differences between the location where the gaseous reaction products are formed and the location where the reverse reaction takes place through dissociation of the reaction products. Such chemical transport reactions are discussed in the book by M. Schäfer entitled "Chemical Transport Reactions," Berg Strasse, Weinheim, Verlag Chemie, 1962, page 11.

To deposit a niobium-tin layer on a carrier or support by means of a chemical transport reaction, iodine is suitably utilized as the transport vehicle. The temperature of formation of gaseous iodides of niobium and tin is such that temperatures of between 400° and 500° C. may be conveniently employed. These relatively low temperatures present the advantage that glass equipment may be utilized for carrying out the iodides forming reaction.

The carrier or support materials on which it is desired to form a niobium-tin coating may be located in the same vessel as is the iodide forming reaction materials but at a different location therein.

In the carrier transport reaction, according to the invention, the carrier or support material, which may suitably be wire, bands and discs comprising metals such as niobium and tantalum, quartz and the like, is heated to a temperature higher than the dissociation temperature of the gaseous niobium and tin iodides but less than the melting point of the carrier material, a suitable temperature being between 1000° to 1300° C. The carrier material may suitably be electrically heated by connection to a potential source, such heating being capable of being carried out in a glass vessel.

The chemical transport reaction is preferably carried out in an evacuated sealed system. In such system, a material transport takes place, essentially by gas diffusion, from the colder reaction zone to the hotter dissociation zone. Consequently, niobium iodide and tin iodide, in accordance with the reaction, are transported from the colder iodide formation zone to the hotter carrier material zone where the iodides dissociate and the niobium-tin compound $Nb_3Sn$ is deposited on the carrier.

Generally speaking and in accordance with the invention, there is provided a chemical transport reaction process for providing a layer of niobium-tin on a support comprising reacting a given temperature in one location of evacuated apparatus, niobium-tin with a material which undergoes reaction with the niobium-tin to form reaction products therefrom which are gaseous at such given temperature and which undergo a reverse dissociation reaction at a temperature higher than the given temperature, while concurrently heating at another location, a carrier support to a temperature at least equal the aforesaid higher dissociation temperature but less than the melting point of the material constituting the support, the gaseous reaction products being transported through gas diffusion from the colder one location to the hotter other location whereat dissociation of said gaseous reaction products takes place with the depositing of the niobium-tin compound on said carrier.

The foregoing and more specific objects and features of my invention will be apparent from, and will be mentioned in the following description of the process for providing superconductive layers of niobium-tin according to the invention shown by way of example in the accompanying drawing in which the sole figure is a schematic depiction of apparatus partly in section, for carrying out the chemical transport reaction process according to the invention.

Referring now to the drawing, there is shown therein a sealable glass tube 1 which may suitably be about 30 cm. long and about 4 cm. in diameter. Sealed airtight within tube 1 are a pair of pins 2 which may suitably consist of a high melting point metal such as molybdenum. Mounted at the lower ends respectively, i.e., those ends of pins 2 which are contained within tube 1, are sleeves 3, suitably consisting of a material such as nickel. To sleeves 3, there is attached a support 4 upon which it is desired to form a niobium-tin coating, support 4 being shown in the figure as having a wire configuration. The respective outer ends, i.e., the ends exterior to tube 1 of pins 2, are connected to potential source 5 which may suitably be a battery, source 5 supplying heating current to pins 2 and, consequently, support 4.

At the lower end of tube 1, there is contained the mixture 6 of the niobium-tin and the material it is to be reacted with to form the dissociable gaseous reaction products. Tube 1 is suitably contained within a heating device 7, such as an oven, for heating mixture 6 to the necessary temperature for forming the gaseous reaction products.

To carry out the chemical transport reaction process according to the invention, finely powdered niobium-tin compound ($Nb_3Sn$) and a small quantity of iodine are placed in tube 1, the niobium-tin compound being suitably produced by the sintering of tin and niobium or by the reduction of their gaseous chlorides. Tube 1 is then evacuated to a pressure of about $10^{-5}$ Torr. Since iodine might evaporate during the evacuation step, the lower portion of tube 1 is cooled, suitably with a material such as liquid nitrogen, to prevent such evaporation. After the completion of the evacuation, tube 1 is sealed and then it is heated to about 400° to 500° C. by oven 7 while, concurrently, support 4 is heated to a temperature of about 1000° to 1300° C. by the current supplied from potential source 5, the latter temperature exceeding the dissociation temperature of niobium-tin iodides. The gaseous niobium-tin iodides formed at the bottom of tube 1 are transported to support 4 through gas diffusion at which point they dissociate and a coating of niobium-tin ($Nb_3Sn$) is deposited on support 4.

Although support 4 is shown in the figure as a wire, it may be a band, a disc or a member of any other configuration. It may suitably be constituted of a material with a relatively high melting point such as niobium, tantalum, quartz and the like.

With the inventive process, the depositing of niobium-tin layers on a niobium support has produced niobium-tin layers having a transition temperature of 18° K. Niobium-tin layers have also been formed on tantalum wire and on quartz discs. In the coating of quartz discs with a niobium-tin layer, it has been found suitable to slit the discs up to about half their diameters and to insert a tantalum tape into a slit, the tantalum tape being the means through which a disc is heated above the aforesaid dissociation temperature. The coating resulting on the disc, as shown by roentgenographic analysis consists of single phase $Nb_3Sn$.

Where it is desired to provide a coating of niobium-tin on an underlying niobium substrate, mixture 6 need only comprise tin and iodine. Then, upon heating tube 1 at about 400° to 500° C. while simultaneously electrically heating a niobium member 4 to be coated to about 1000° to 1300° C., gaseous tin formed at the bottom of tube 1 is transported by gas diffusion to the location of the niobium member where it dissociates and the tin liberated thereby reacts with the niobium to form a layer of niobium-tin on the niobium member.

From the foregoing, it is seen that there is provided a process for forming a superconductive layer of niobium-tin on a substrate which is simple, relatively inexpensive, permits the use of temperatures much lower than heretofore used in processes for like purposes, and produces superconductive niobium-tin coatings which have a transition temperature of 18° K. The inventive process is particularly suitable for providing a layer of superconductive niobium-tin on relatively small bodies.

It will be obvious to those skilled in the art, upon studying this disclosure, that processes for providing superconductive layers of niobium-tin according to my invention permit of a great variety of modifications and hence can be given embodiments other than those particularly described and illustrated herein without departing from the essential features of my invention and within the scope of the claims annexed hereto.

I claim:

1. A process for producing a coating of niobium-tin on a support comprising reacting in one loaction of a sealed evacuated system, iodine and said niobium-tin at a temperature at least sufficiently high to produce iodides of said niobium-tin in the gaseous state while concurrently heating a support at another loaction in said system to a temperature at least equal to the dissociation temperatures of said iodides but less than the melting point of the material constituting said support, the gaseous iodides being transported through gas diffusion from said colder one location to said hotter other location, said gaseous iodides thermally dissociating at said other location and said niobium-tin compound dissociation product depositing upon said support.

2. The process for producing a coating of superconductive $Nb_3Sn$ on a support member comprising reacting finely powdered $Nb_3Sn$ with iodine at one location in sealed evacuated apparatus at a temperature of about 400° to 500° C. to form gaseous iodides of said $Nb_3Sn$ while concurrently heating a support member to a temperature of about 1000° to 1300° C. at another loaction in said system, said gaseous iodides being transported through gas diffusion from said colder one location to said hotter other location, said gaseous iodides thermally dissociating at said other location and said $Nb_3Sn$ dissociation product depositing upon said support.

3. A process as defined in claim 2 wherein said sealed system is evacuated to a pressure of about $10^{-5}$ Torr.

4. A process as defined in claim 3 wherein the material constituting said support member is niobium.

5. A process as defined in claim 3 wherein the material constituting said support member is tantalum.

6. A process as defined in claim 3 wherein the material constituting said support is quartz.

7. A process for producing a coating of niobium-tin on a niobium substrate member comprising reacting tin with iodine at one loaction of an evacuated sealed system at a tempearture of from 400° to 500° C. to form gaseous tin iodide while simultaneously heating said niobium substrate member to a temperature of about 1000° to 1300° C. at another loaction in said system, said gaseous tin iodide being transported through gas diffusion from said colder one location to said hotter other loaction, said gaseous tin iodide dissociating at said other location to liberate tin thereat, said tin reacting with said niobium to form a layer of niobium-tin on the surface of said substrate.

References Cited

UNITED STATES PATENTS

| | | | |
|---|---|---|---|
| 3,089,788 | 5/1963 | Marinace | 117—107.2 XR |
| 3,096,209 | 7/1963 | Ingham | 117—201 |
| 3,181,936 | 5/1965 | Denny et al. | 29—194 |
| 3,268,362 | 8/1966 | Hanak et al. | 117—227 |

OTHER REFERENCES

German Auslegeschrift, 1,079,418, April 1960 Fast, p. 2,223.

WILLIAM L. JARVIS, *Primary Examiner.*